(12) United States Patent
Zhao et al.

(10) Patent No.: US 10,976,942 B2
(45) Date of Patent: Apr. 13, 2021

(54) VERSIONING A CONFIGURATION OF DATA STORAGE EQUIPMENT

(71) Applicant: EMC IP Holding Company LLC, Hopkinton, MA (US)

(72) Inventors: Junping Zhao, Beijing (CN); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 16/168,941

(22) Filed: Oct. 24, 2018

(65) Prior Publication Data

US 2020/0133527 A1    Apr. 30, 2020

(51) Int. Cl.
| | |
|---|---|
| *G06F 15/177* | (2006.01) |
| *G06F 3/06* | (2006.01) |
| *H04L 12/24* | (2006.01) |
| *G06F 12/02* | (2006.01) |

(52) U.S. Cl.
CPC ............ *G06F 3/0629* (2013.01); *G06F 3/067* (2013.01); *G06F 3/0607* (2013.01); *G06F 3/0653* (2013.01); *G06F 12/0246* (2013.01); *H04L 41/0813* (2013.01); *H04L 41/0859* (2013.01); *G06F 2212/7202* (2013.01); *G06F 2212/7206* (2013.01)

(58) Field of Classification Search
CPC ...... G06F 3/0629; G06F 3/067; G06F 3/0607; G06F 3/0653; G06F 12/0246; G06F 2212/7206; G06F 2212/7202; H04L 41/0813; H04L 41/0859; H04L 41/0803; H04L 41/0806; H04L 41/082; H04L 41/0226; H04L 41/12
USPC .................................................. 709/220–223
See application file for complete search history.

(56) References Cited

U.S. PATENT DOCUMENTS

| | | |
|---|---|---|
| 7,792,800 B1 | 9/2010 | Carson, Jr. et al. |
| 8,510,265 B1 | 8/2013 | Boone et al. |
| 8,713,356 B1 | 4/2014 | Chan et al. |
| 8,959,287 B1 | 2/2015 | Shajenko, Jr. et al. |
| 9,026,679 B1 | 5/2015 | Shmuylovich et al. |
| 9,081,594 B1 | 7/2015 | Labonte et al. |
| 9,830,228 B1 | 11/2017 | Chopra et al. |
| 9,928,120 B1 | 3/2018 | Chinnam et al. |
| 10,027,547 B1 | 7/2018 | Weller et al. |
| 10,057,273 B1 | 8/2018 | Chakraborty et al. |
| 10,146,646 B1 | 12/2018 | Foley et al. |

(Continued)

*Primary Examiner* — Farzana B Huq
(74) *Attorney, Agent, or Firm* — BainwoodHuang

(57) ABSTRACT

A technique versions a configuration of data storage equipment. The technique involves receiving, while the data storage equipment operates in accordance with a first version of the configuration of the data storage equipment, a configuration change command to change the configuration of the data storage equipment. The technique further involves changing the first version of the configuration of the data storage equipment to a second version of the configuration of the data storage equipment in response to the configuration change command. The technique further involves, while the data storage equipment operates in accordance with the second version of the configuration of the data storage equipment, concurrently maintaining access to the first version of the configuration of the data storage equipment and the second version of the configuration of the data storage equipment.

20 Claims, 8 Drawing Sheets

(56) References Cited

U.S. PATENT DOCUMENTS

| | | | |
|---|---|---|---|
| 2012/0159139 A1* | 6/2012 | Kim | G06F 21/74 |
| | | | 713/2 |
| 2019/0296976 A1* | 9/2019 | Maes | H04L 41/0859 |
| 2020/0004446 A1* | 1/2020 | Palmer | G06F 3/0619 |

* cited by examiner

VERSIONING A CONFIGURATION OF DATA STORAGE EQUIPMENT

BACKGROUND

A data storage system performs host read and host write operations on behalf of one or more external host devices. Examples of such host devices include file servers, web servers, email servers, database servers, transaction servers, combinations thereof, and the like.

During operation, the data storage system may encounter various changes. Along these lines, a human administrator may change the size of a cache, replace a magnetic disk drive, invoke/disable snapshotting, add/remove replication targets, alter the time at which backups are performed, and so on.

For example, suppose that a human administrator initially sets up an asynchronous replication session between a first storage array and a second storage array to asynchronously replicate a particular storage object from the first storage array to the second storage array. At some later time and perhaps among other activities, the human administrator may decide to change how the particular storage object is replicated from the first storage array to the second storage array. For instance, suppose the human administrator operates a graphical user interface (GUI) of the data storage system to change the process of replicating the particular storage object from asynchronous replication to synchronous replication. Accordingly, the GUI overwrites the current replication setting from "asynchronous" to "synchronous". In turn, the data storage system responds by synchronizing the particular storage object from the first storage array to the second storage array and thereafter performing synchronous replication on the particular storage object.

SUMMARY

Unfortunately, there are deficiencies to the above described approach to effectuating a data storage system change. Along these lines, the data storage system change may cause an unforeseen condition and the human administrator may have difficulty ascertaining the cause of that condition.

For example, in the above-described situation, suppose that the human administrator discovers that write operations to the particular storage object have become extremely slow. Unfortunately, it may be unclear to the human administrator whether the replication change from "asynchronous" to "synchronous" is the cause of the write speed degradation or if there is some other cause (e.g., network traffic issues, a recent change in cache size, a change in when backups are performed, a snapshotting change, etc.). Furthermore, the human administrator may not remember when various data storage system changes were made or even recall that certain data storage system changes were made since the original replication settings were simply overwritten, and thus find it extremely difficult to identify a root cause for the unforeseen condition.

In contrast to the above-described situation in which it is difficult for the human administrator to ascertain a cause of an unforeseen condition, improved techniques are directed to versioning a configuration of data storage equipment. Such versioning maintains different data storage equipment configuration versions over time (e.g., by appending new entries describing new configuration changes to a string of entries describing previous configuration changes). Accordingly, the different configuration versions can be correlated with previously recorded data storage equipment behavior to identify particular causes for behavior changes (e.g., changes in performance, causes of certain faults or failures, etc.). Once a particular cause has been identified, remedial action may be taken to address the situation (e.g., undo the change, make a compensating adjustment, etc.).

One embodiment is directed to a method, which is performed within data storage equipment, of versioning a configuration of the data storage equipment. The method includes, while the data storage equipment operates in accordance with a first version of the configuration of the data storage equipment, receiving a configuration change command to change the configuration of the data storage equipment. The method further include, in response to the configuration change command, changing the first version of the configuration of the data storage equipment to a second version of the configuration of the data storage equipment. The method further includes, while the data storage equipment operates in accordance with the second version of the configuration of the data storage equipment, concurrently maintaining access to the first version of the configuration of the data storage equipment and the second version of the configuration of the data storage equipment.

In some arrangements, the data storage equipment performs host input/output (I/O) operations on behalf of a set of host computers when the data storage equipment operates in accordance with the first version of the configuration and the second version of the configuration. Additionally, the configuration of the data storage equipment includes different operating features. Furthermore, changing the first version of the configuration to the second version of the configuration includes modifying at least one of the different operating features of the configuration while the data storage equipment performs the host I/O operations.

In some arrangements, the method further includes, while the data storage equipment operates in accordance with the first version of the configuration and while the data storage equipment operates in accordance with the second version of the configuration, recording behavior of the data storage equipment. Example of such behavior include average response times for particular operations, storage space consumption, fault counts, and so on.

In some arrangements, concurrently maintaining access to the first version of the configuration and the second version of the configuration includes:

(i) storing, in non-volatile memory, a first version entry within a series of version entries that identifies changes to the configuration of the data storage equipment over time, the first version entry identifying a first change made to the configuration of the data storage equipment at a first time, and (ii) storing, in the non-volatile memory, a second version entry within the series of version entries that identifies changes to the configuration of the data storage equipment over time, the second version entry identifying a second change made to the configuration of the data storage equipment at a second time that is after the first time.

In some arrangements, recording the behavior of the data storage equipment includes storing, in the non-volatile memory, a series of behavior entries that identifies behavior events occurring within the data storage equipment over time.

In some arrangements, the method further includes performing a set of correlation operations based on the series of behavior entries and the series of version entries to generate a set of correlation results that identify correlations between the behavior events occurring within the data storage equipment and the changes to the configuration of the data storage equipment.

In some arrangements, the method further includes, based on the set of correlation results, electronically outputting a user notification that identifies a particular configuration change as a cause of a particular behavior event occurring within the data storage equipment.

In some arrangements, the method further includes, while the data storage equipment operates in accordance with the second version of the configuration of the data storage equipment, receiving another configuration change command to change the configuration of the data storage equipment. The method further includes, in response to the other configuration change command, changing the second version of the configuration of the data storage equipment to a third version of the configuration of the data storage equipment. The method further includes, while the data storage equipment operates in accordance with the third version of the configuration of the data storage equipment, concurrently maintaining access to the first version of the configuration of the data storage equipment, the second version of the configuration of the data storage equipment, and the third version of the configuration of the data storage equipment.

In some arrangements, storing the first version entry within the series of version entries that identifies changes to the configuration of the data storage equipment over time includes appending the first version entry to a first string of version entries that identifies previous changes to the configuration of the data storage equipment to form a second string of version entries. Additionally, storing the second version entry within the series of version entries that identifies changes to the configuration of the data storage equipment over time includes appending the second version entry to the second string of version entries to form a third string of version entries. Furthermore, concurrently maintaining access to the first version, the second version, and the third version includes appending a third version entry to the third string of version entries to form a fourth string of version entries. The third version entry identifies a third change made to the configuration of the data storage equipment at a third time that is after the second time, and the fourth string of version entries defines the third version of the configuration of the data storage equipment.

In some arrangements, the different operating features include operating parameters that control allocation of data storage equipment resources. Additionally, modifying at least one of the different operating features of the configuration includes adjusting a set of the operating parameters to modify allocation of a set of the data storage equipment resources, the adjustment to the set of the operating parameters causing a change in host I/O operation performance.

In some arrangements, adjusting the set of the operating parameters to modify allocation of the set of the data storage equipment resources includes changing a memory management setting to modify use of semiconductor memory of the data storage equipment.

In some arrangements, adjusting the set of the operating parameters to modify allocation of the set of the data storage equipment resources includes changing a storage device assignment setting to modify assignment of storage devices to host data storage objects within the data storage equipment.

In some arrangements, adjusting the set of the operating parameters to modify allocation of the set of the data storage equipment resources includes changing a snapshot setting to modify operation of a snapshot service of the data storage equipment.

In some arrangements, adjusting the set of the operating parameters to modify allocation of the set of the data storage equipment resources includes changing a replication setting to modify operation of a replication service of the data storage equipment.

Another embodiment is directed to data storage equipment which includes memory, and control circuitry coupled with the memory. The memory stores instructions which, when carried out by the control circuitry, cause the control circuitry to:
(A) while the data storage equipment operates in accordance with a first version of a configuration of the data storage equipment, receiving a configuration change command to change the configuration of the data storage equipment,
(B) in response to the configuration change command, changing the first version of the configuration of the data storage equipment to a second version of the configuration of the data storage equipment, and
(C) while the data storage equipment operates in accordance with the second version of the configuration of the data storage equipment, concurrently maintaining access to the first version of the configuration of the data storage equipment and the second version of the configuration of the data storage equipment.

Yet another embodiment is directed to a computer program product having a non-transitory computer readable medium which stores a set of instructions to version a configuration of data storage equipment. The set of instructions, when carried out by computerized circuitry of the data storage equipment, causes the computerized circuitry to perform a method of:
(A) while the data storage equipment operates in accordance with a first version of the configuration of the data storage equipment, receiving a configuration change command to change the configuration of the data storage equipment;
(B) in response to the configuration change command, changing the first version of the configuration of the data storage equipment to a second version of the configuration of the data storage equipment; and
(C) while the data storage equipment operates in accordance with the second version of the configuration of the data storage equipment, concurrently maintaining access to the first version of the configuration of the data storage equipment and the second version of the configuration of the data storage equipment.

It should be understood that, in the cloud context, at least some of the electronic circuitry disclosed herein is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in versioning a configuration of data storage equipment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to versioning a configuration of data storage equipment. Such versioning maintains a history of different data storage equipment configuration versions over time (e.g., by appending new entries describing new configuration changes to a sequence of entries describing past configuration changes). Accordingly, the different configuration versions may be retrieved and analyzed. For example, such versions can be correlated with previously recorded data storage equipment behavior to identify particular causes for behavior changes such as changes in performance, causes of certain faults or failures, and so on. Once a particular cause has been identified, remedial action may be taken to address the situation such as undoing a particular configuration change, making another configuration change (e.g., to a different operating feature) to compensate, and so on.

Figure 1:
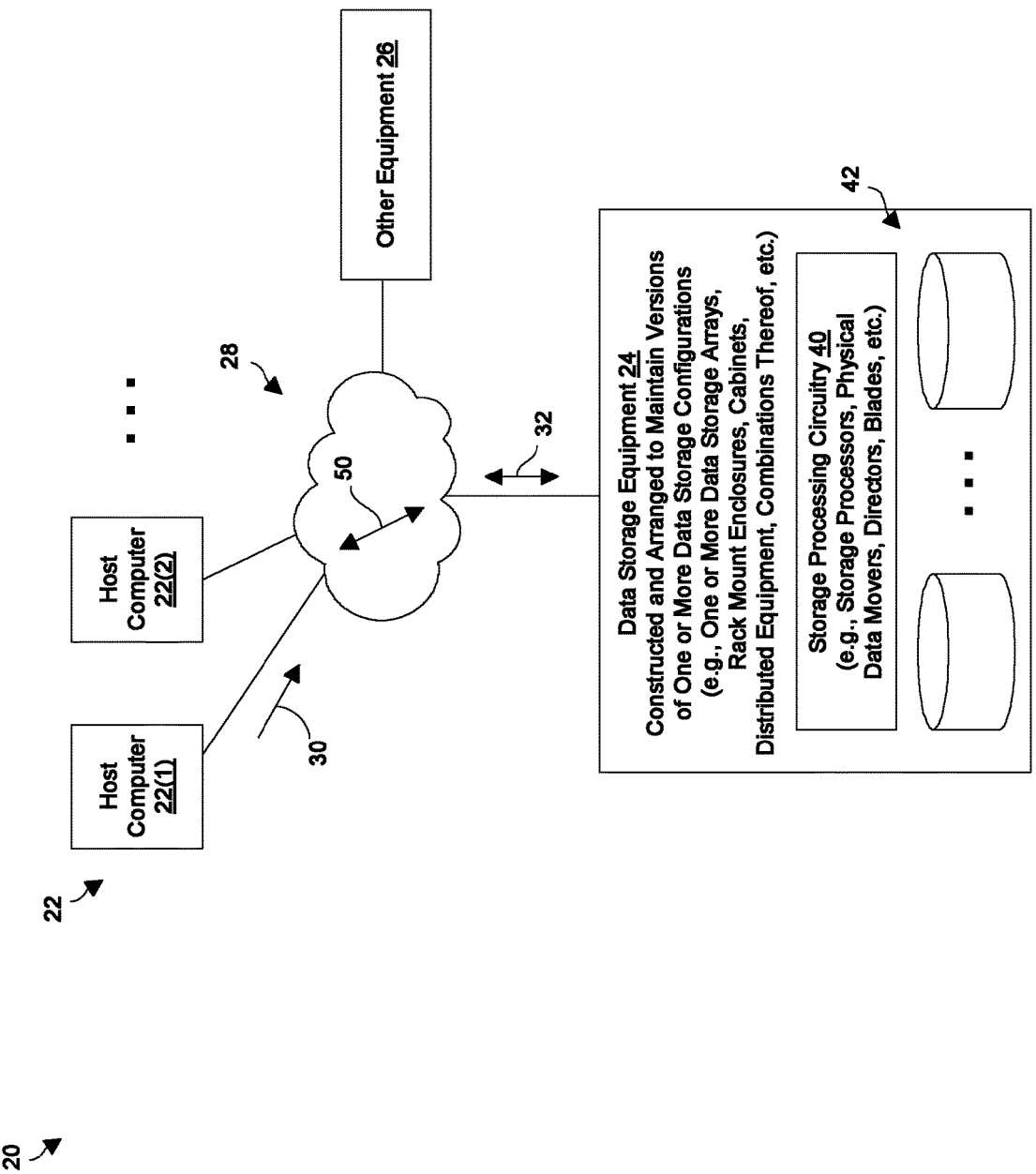
FIG. 1 is a block diagram of a data storage environment which performs versioning of a configuration of data storage equipment.

FIG. 1 shows a data storage environment 20 which performs versioning of a data storage equipment configurations. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. In this context, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage objects (e.g., a file, a file system, a logical unit of storage or LUN, a volume, a virtual volume or VVol, etc.).

The data storage equipment 24 includes storage processing circuitry 40 and storage devices 42. The storage processing circuitry 40 is constructed and arranged to respond to the host I/O requests 30 from the host computers 22 by writing host data 32 into the storage devices 32 and reading host data 32 from the storage devices 32 (e.g., solid state drives, magnetic disk drives, combinations thereof, etc.). The storage processing circuitry 40 may include one or more physical storage processors or engines, data movers, director boards, blades, I/O modules, storage drive controllers, switches, other hardware, combinations thereof, and so on. While processing the host I/O requests 30, the storage processing circuitry 40 is constructed and arranged to provide a variety of specialized data storage system services such as caching, tiering, deduplication, compression, encryption, mirroring, providing RAID (redundant array of independent disks) protection, snapshotting, backup/archival services, replication, and so on.

Additionally, the data storage equipment 24 may take a variety of topologies. In some arrangements, all of the data storage equipment 24 resides in a single location (e.g., a single cabinet, lab, room, floor, building, campus, etc.). In other arrangements, the data storage equipment 24 includes components that are distributed among multiple locations (e.g., different corners of a room, floors, buildings, campuses, towns, states, coasts, countries, etc.).

Furthermore, the data storage equipment 24 make take a variety of different forms such as one or more disk array enclosures, rack mount equipment, electronic cabinets, data storage arrays, and/or assemblies, distributed equipment, and so on. Moreover, the data storage equipment 24 is capable of performing different data storage operations, e.g., file-based operations, block-based operations, combinations thereof, etc.

The other equipment 26 refers to other componentry of the data storage environment 20 that may be accessed by the host computers 22 and/or the data storage equipment 24, or other componentry that may be able to access the host computers 22 and/or the data storage equipment 24. For example, the other equipment 26 may include a user device (e.g., a desktop, a laptop, a tablet, a smartphone, a terminal, etc.) which is able to access a host computer 22. As another example, the other equipment 26 may include a storage administrative device (e.g., a service processor) which is able to access the data storage equipment 24.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 to the data storage equipment 24 for processing. In response, the storage processing circuitry 40 of the data storage equipment 24 robustly and reliably performs host I/O operations such as writing host data 32 into and reading host data 32 from the storage devices 42. It should be understood that how the data storage equipment 24 performs these data storage operations is based on a set of operating parameters. Such operating parameters dictate particular details of the data storage features/operations provided by the data storage equipment 24, e.g., whether certain operations are performed inline and/or afterward in the background, cache sizes, flushing frequency, deduplication details, compression details, snapshotting details, backups details, replication details, data recovery details, etc.

During such operation, the data storage equipment 24 maintains versions of different data storage equipment configurations that are created in response to changes to various the operating parameters. That is, the data storage equipment 24 captures and retains information describing/defining prior configurations of the data storage equipment 24. Each time there is a change to a current configuration of the data storage equipment 24 (e.g., a cache size change, a storage device replacement, a change to a snapshot policy, a change to a replication policy, a change to a recovery point objective or RPO, etc.), the data storage equipment 24 considers a new configuration version to have been created and appends a configuration entry that identifies the current configuration change to a series of prior configuration entries identifying previous configuration changes. Accordingly, data storage equipment 24 maintains a historical log, or past versions, of such configuration changes.

Concurrently, the data storage equipment 24 may record behavior of the data storage equipment 24. Along these lines, the data storage equipment 24 may capture and preserve behavior data (e.g., performance information, fault events, status, etc.) in a series of behavior entries that identify behavior events (e.g., fault events, failure events, periodic performance measurements, captured status of background tasks, etc.) so that the behavior data can be correlated with the various version information that is maintained. In some arrangements, the configuration entries and the behavior entries can be compared to identify event causes, performance patterns, trends, and so on.

As a result, remedial activities may be performed to address the particular situation. For example, a particular operating parameter causing an undesirable event can be undone or set back to an original setting, a particular feature or service can be disabled/enabled/reset/reinstalled/etc., a hardware component that was recently added can be replaced, other resources can be allocated/deallocated to compensate, and so on. Further details will now be provided with reference to FIG. 2.

Figure 2:
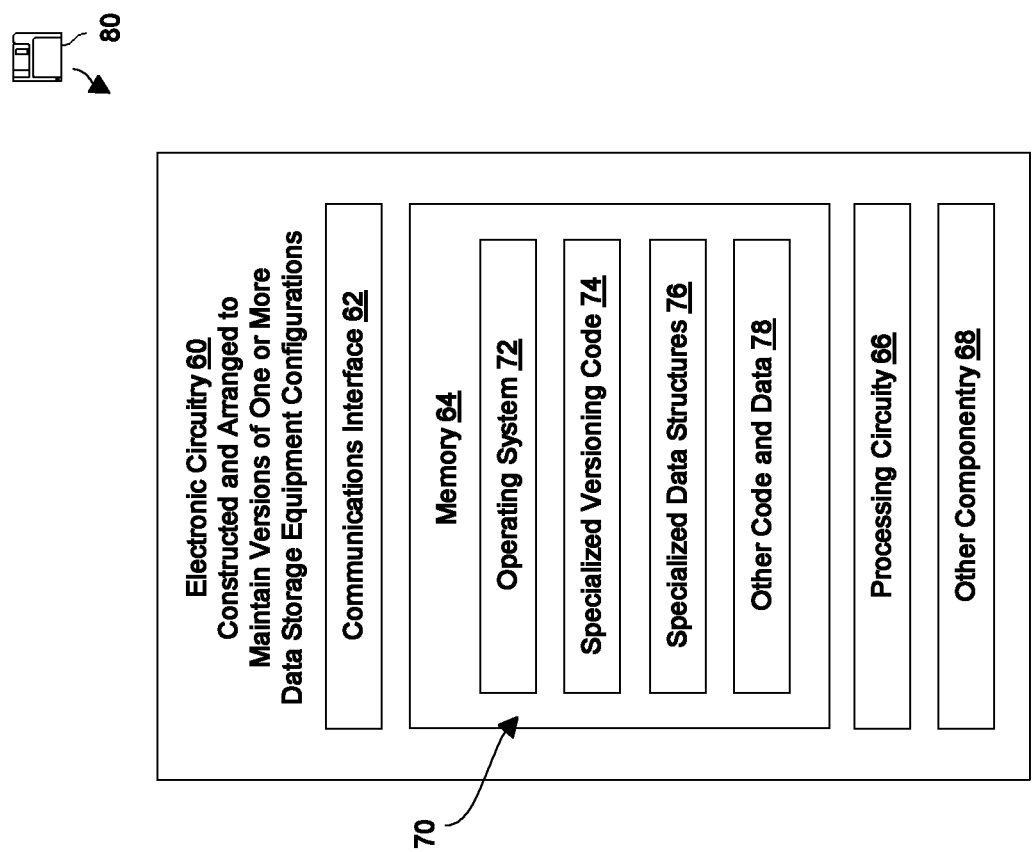
FIG. 2 is a block diagram of electronic circuitry which is suitable for use within the data storage environment of FIG. 1.

FIG. 2 shows an electronic circuitry 60 which is suitable for use within the data storage environment 20 (also see FIG. 1). The electronic circuitry 60 includes a communications interface 62, memory 64, and processing circuitry 66, and other componentry 68.

The communications interface 62 is constructed and arranged to connect the electronic circuitry 60 to the communications medium 28 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72 specialized versioning code 74, specialized data structures 76, and other code and data 78. The operating system 72 refers to particular control instructions such as a kernel to manage computerized resources (e.g., processor cycles, memory space, etc.), drivers (e.g., an I/O stack), and so on. The specialized versioning code 74 refers to instructions that enable versioning of data storage equipment configurations. The specialized data structures 76 includes entries that are created and managed to maintain versions of one or more data storage equipment configurations (e.g., control settings, timestamps, saved user commands, etc.). The other code and data 78 include applications and routines to provide additional operates and services (e.g., behavior recordation tools and data, performance measurement tools, etc.), user-level applications, administrative tools, utilities, and so on.

The processing circuitry 66 is constructed and arranged to operate in accordance with the various software constructs 70 stored in the memory 64. As will be explained in further detail shortly, the processing circuitry 66 executes the specialized versioning code 74 to form specialized control circuitry that creates and maintains versions of one or more data storage equipment configurations. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the storage processing circuitry 40. In particular, the computer program product 80 has a non-transitory (or non-volatile) computer readable medium which stores a set of instructions which controls one or more operations of the storage processing circuitry 40. Examples of suitable computer readable storage media include tangible articles of manufacture and apparatus which store instructions in a non-volatile manner such as CD-ROM, flash memory, disk memory, tape memory, and the like.

The other componentry 68 refers to other hardware of the electronic circuitry 60. Along these lines, the electronic circuitry 60 may include storage device adaptors, a user interface, other specialized data storage hardware, etc.

It should be understood that, by way of example, configuration versioning was described as taking place within the data storage equipment 24 itself. In such arrangements (where the electronic circuitry 60 resides within the data storage equipment 24 and perhaps forms a portion of the storage processing circuitry 40, also see FIG. 1), the specialized control circuitry that performs such versioning has direct access to configuration data that controls operation of the data storage equipment 24, behavior data describing performance of the data storage equipment 24, and so on.

Nevertheless, it should be further understood that such configuration versioning may also be performed from an external point. For example, the electronic circuitry 60 may reside in the other equipment 26 (FIG. 1) and communicate with the data storage equipment 24 to obtain configuration data, behavior data, and so on. In such arrangements, the other equipment 26 may even be considered part of the data storage equipment or the data storage system that provides data storage services to the host computers 22. Further details will now be provided with reference to FIG. 3.

Figure 3:
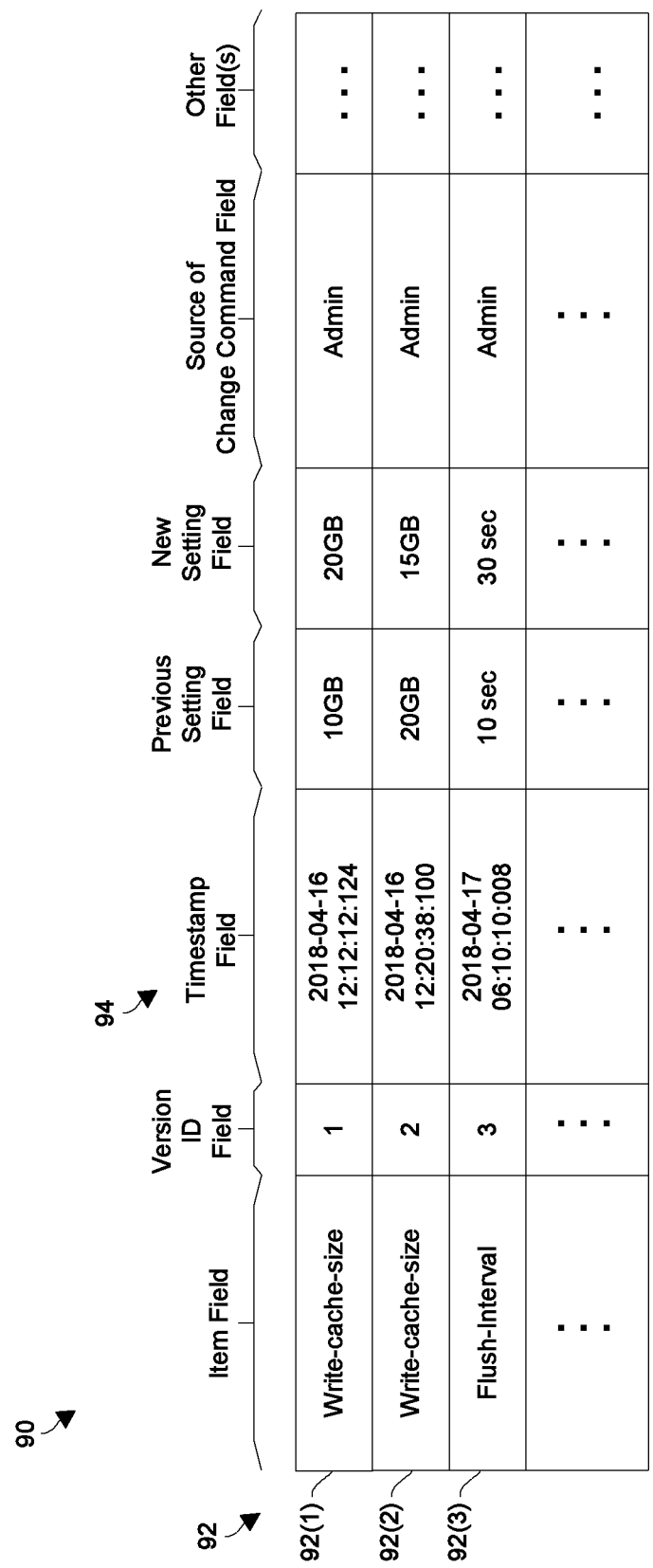
FIG. 3 is a diagram which graphically illustrates particular data storage equipment versioning details.

FIG. 3 shows a table 90 of example configuration changes that are provided to the data storage equipment 24 over time while the data storage equipment 24 performs host I/O operations on behalf of the set of host computers 22 (FIG. 1). The table 90 includes a command items 92(1), 92(2), 92(3), . . . (collectively, command items 92) which are received by the data storage equipment 24 at different times of operation. The table includes a new item 92 each time the data storage equipment 24 receives a new confirmation change command.

Each command item 92 includes a group of fields 94 such as an item field, a version ID field, a timestamp field, a previous setting field, a new setting field, a source of change command field, and other fields. The contents of the item field of each command item 92 identifies a particular operating parameter that is being changed by that item 92 (e.g., cache size, snapshot intervals, replication features, etc.). The contents of the version ID field uniquely identify a particular configuration version associated with that item 92. The contents of the timestamp field uniquely identify a particular time of receipt of a configuration change command associated with that item 92. The contents of the previous setting field identify a previous instance or value for the operating parameter that is changed by the configuration change command associated with that item 92. The contents of the new setting field identify a new instance or value for the operating parameter that is changed by the configuration change command associated with that item 92. The source of change command field identifies a source of the configuration change command (e.g., a user via a GUI, a local application or service, an external device, etc.). The other fields represent other data (e.g., system status, an indication of successful or unsuccessful processing, etc.).

It should be understood that there are a variety of suitable ways for storing the information in the table 90. In accordance with some embodiments, the information is stored as shown in a file or other data structure in non-volatile memory. In other embodiments, the information is stored in a series of entries where each new change is appended to an earlier created string of entries. In some arrangements, at least some of the information is included in block metadata (BMD) which resides in a dedicated portion of the storage blocks that hold regular data (e.g., host data 32). Further details will now be provided with reference to FIG. 4.

Figure 4:
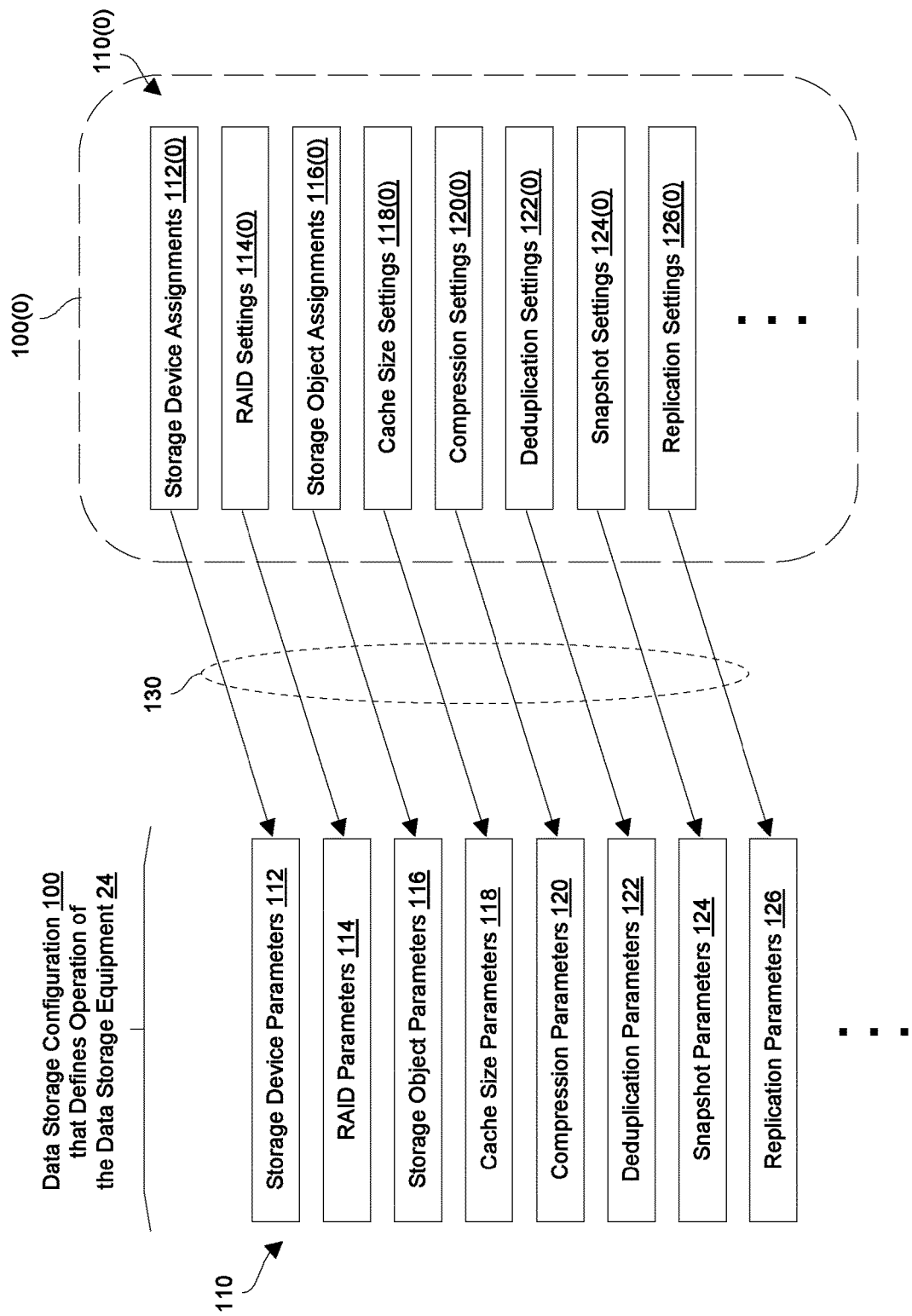
FIG. 4 is a diagram which graphically illustrates further data storage equipment versioning details.

FIG. 4 graphically illustrates a collection 100 of operating parameters 110 that provide control to various operating features of the data storage equipment 24 (also see FIG. 1). The operating parameters 110 included within the collection 100 are provided by way of example only, and the actual collection 100 may omit certain operating parameters 110 that are shown in FIG. 4 or include other operating parameters 110 that are not shown in FIG. 4.

In the example that is shown in FIG. 4, the collection 100 of operating parameters 110 includes storage device parameters 112 (e.g., to identify which storage devices belong to which RAID groups), RAID parameters 114 (e.g., to identify particular RAID levels performed by particular RAID groups), storage object parameters 116 (e.g., to identify which storage objects reside in particular RAID groups), cache size parameters 118 (e.g., to identify sizes for write caches, read caches, etc.), compression parameters 120 (e.g., to identify whether compression is enabled/disabled for particular storage objects), deduplication parameters 122 (e.g., to identify whether deduplication is enabled/disabled for particular storage objects), snapshot parameters 124 (e.g., to identify snapshot policies/rules for particular storage objects), replication parameters 126 (e.g., to identify replication policies/rules for particular storage objects), and so on.

As further shown in FIG. 4, a particular data storage configuration version (or instance) 100(0) for the collection 100 of operating parameters 110 (as shown by the dashed shape) includes particular operating parameter instances or settings 110(0). That is, the particular operating parameter instances 110(0) define the data storage configuration version 100(0). To this end, the operating parameter instances 110(0) include particular storage device assignments 112(0), RAID settings 114(0), storage object assignments 116(0), cache size settings 118(0), compression settings 120(0), deduplication settings 122(0), snapshot settings 124(0), replication settings 126(0), and so on.

In FIG. 4, the arrows 130 illustrate that the data storage equipment 24 is able to use the operating parameter instances 110(0) of the particular configuration version 100(0) to operate. That is, while the operating parameters 110 are set to the operating parameter instances 110(0), the data storage equipment 24 processes host I/O requests 30 to provide the host computers 22 with access to the host data 32 (also see FIG. 4). How particular host data 32 is stored is determined by the particular operating parameter instances 110(0).

It should be understood that specialized control circuitry (e.g., the processing circuitry 66 operating in accordance with the specialized versioning code 74, also see FIG. 2) has access to various portions of the data storage equipment 24 and can read and/or modify the current settings or values of the operating parameters 110 while the data storage equipment 24 performs host I/O operations on behalf of the host computers 22 (FIG. 1). Moreover, the current settings may not necessarily reside in a single location but instead reside in different locations within the data storage equipment 24 (e.g., a system config area, a snapshot service area, a replication service area, etc.). Further details will now be provided with reference to FIG. 5.

Figure 5:
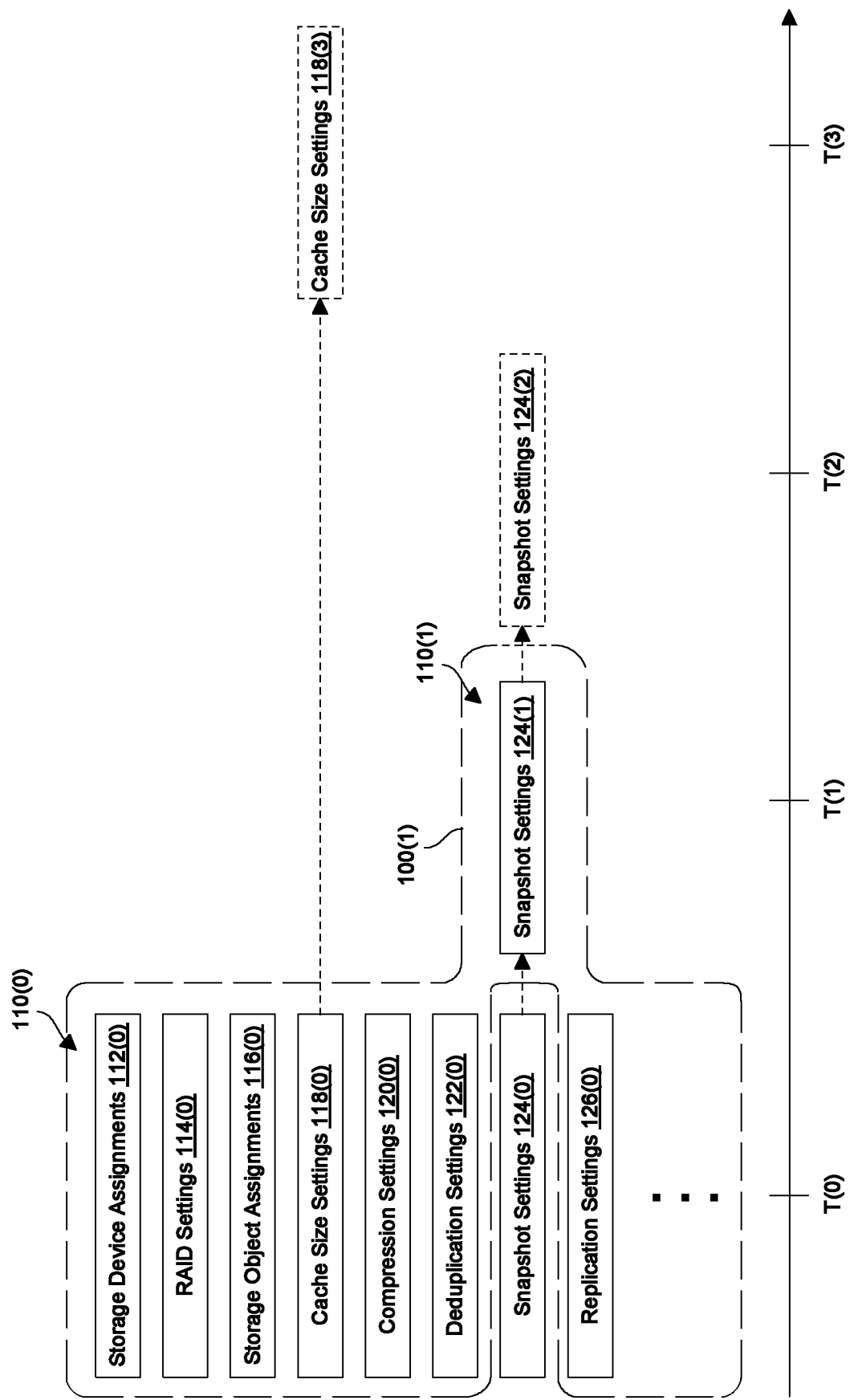
FIG. 5 is a diagram which graphically illustrates other data storage equipment versioning details.

FIG. 5 shows, by way of example, how a configuration change results in a new configuration version 100(1) and how the system is able to maintain both the original configuration version 100(0) and the new configuration version 100(1) for future access. In particular, suppose that a user (e.g., a human data storage equipment administrator) had entered the original operating parameter instances 110(0) at time T(0) and that the data storage equipment 24 has been operating for some time using the original operating parameter instances 110(0).

Now, suppose that the user enters a configuration change command to change one or more configuration parameters 110 at time T(1), which is after time T(0). Here, the control circuitry that provides versioning does not overwrite the previous operating parameter instance 110 (i.e., the earlier value or setting) of the configuration parameter 110 that is being changed. Instead, the control circuitry saves the previous operating parameter instance 110 as well as the new operating parameter instance 110.

For example, as shown in FIG. 5, suppose that the user decides to change the snapshot interval for a particular storage object from one hour (where a new snapshot is created every hour) to 15 minutes (where a new snapshot is created every 15 minutes). As shown by the dashed arrow from box 124(0) (representing the original setting) to box 124(1) (representing the new setting) in FIG. 5, the original snapshot settings 124(0) remain accessible by the data storage equipment 24 but the data storage equipment 24 now uses the more current snapshot settings 124(1). Accordingly, the control circuitry maintains all of the instances 110(0) that defined the configuration version 100(0). However, the control circuitry now considers a new configuration version 110(1) to be formed because there is at least one new operating parameter instance 110(1) (i.e., the new snapshot setting 124(1)).

In particular, as shown by the dashed shape in FIG. 5, the new configuration version 100(1) includes some of the same the operating parameter instances 110(0) from the configuration version 100(0), namely, the storage device assignments 112(0), the RAID settings 114(0), the storage object assignments 116(0), the cache size settings 118(0), the compression settings 120(0), the deduplication settings 122(0), the replication settings 126(0), and so on. However, the configuration version 100(1) does not include the snapshot settings 124(0), but instead includes new snapshot settings 124(1).

Once the user has entered the new operating parameter instance 110(1), the data storage equipment 24 responds by changing its operation and now operates in accordance with the new configuration version 100(1). In particular, the data storage equipment 24 processes host I/O requests 30 to provide the host computers 22 with access to the host data 32 using the operating parameter instances that belong to the new configuration version 100(1).

It should be understood that the user may make further configuration changes over time. For example, at time T(2), the user may make another snapshot setting change such as changing the snapshot interval from every 15 minutes to every 30 minutes (see the dashed box 124(2) in FIG. 4). As shown by the dashed arrow from box 124(1) to box 124(2) in FIG. 4, the snapshot settings 124(1) (as well as the snapshot settings 124(0)) remain accessible by the data storage equipment 24 but the data storage equipment 24 now uses the most current snapshot settings 124(2).

Moreover, the user may make configuration changes to different operating parameters 100 over time. For example, at time T(3), the user may increase (or reduce) the size of a write cache (see the dashed box 118(3) in FIG. 4). As shown by the dashed arrow from box 118(0) to box 118(3) in FIG. 4, the cache size settings 118(0) remain accessible by the data storage equipment 24 but the data storage equipment 24 now uses the more recently entered cache size settings 118(3).

It should be understood that a variety of techniques are suitable for capturing the configuration changes that form the different configuration versions 100(0), 100(1), . . . over time (see FIGS. 4 and 5). For example, the control circuitry can store the configuration change commands themselves and the timestamps when they were entered as a series of entries. Each time the user enters a new configuration command, the control circuitry appends a new entry indicating the particular configuration command and a current timestamp to the series of entries in non-volatile memory.

Other techniques for capturing and maintaining the configuration history are suitable for use as well. For example, the control circuitry can read the actual operating parameters instances 110 and timestamps from the appropriate locations within the data storage equipment 24 and save the actual operating parameter instances 110 as a series of entries in non-volatile memory. As yet another example, the control circuitry can periodically save a complete copy of all of the instances of the operating parameters 110 and timestamps in a series of entries in non-volatile memory.

In accordance with a particular embodiment, the control circuitry periodically captures a full set of the actual instances of the operating parameters 110 in a full entry and then appends incremental entries identifying individual changes to the full entry to form a string of entries. The control circuitry continues in this manner until a string of entries is formed where some entries identify all of the instances of the operating parameters 110 while other entries identify incremental changes. Further details will now be provided with reference to FIG. 6.

Figure 6:
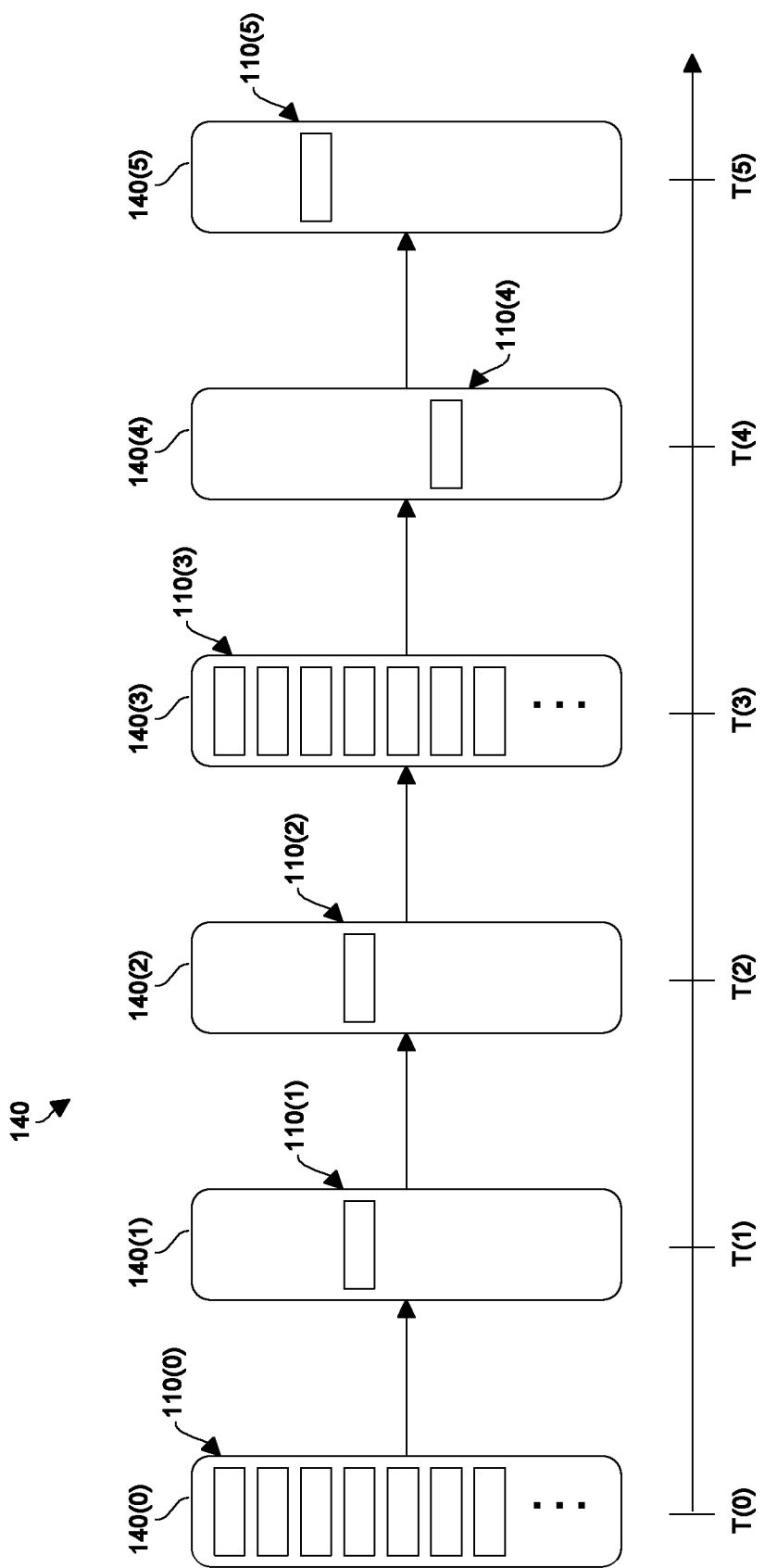
FIG. 6 is a diagram which graphically illustrates additional data storage equipment versioning details.

FIG. 6 graphically illustrates how the control circuitry manages configuration changes that are made to the data storage equipment 24 over time. Along these lines, the control circuitry creates and maintains a series of version entries 140(0), 140(1), 140(2), 140(3), 140(4), 140(5), . . . (collectively, version entries 140) that describe configuration changes. As time progresses, earlier version entries 140 that describe earlier configuration changes (e.g., one or more operating parameter instances, timestamps, related data, etc., also see FIG. 3) are saved (e.g., as a string/sequence of entries 140) and new version entries 140 that describe new configuration changes are appended.

In particular, at time T(0) in FIG. 6, the control circuitry saves a complete set of the instances 110(0) of the operating parameters 110 (and/or change commands, timestamps, related data, etc.) in a starting entry 140(0) (also see FIG. 4). The starting entry 140(0) is a full entry because it includes all of the instances 110(0) of the operating parameters 110 that define a particular configuration version.

At time T(1), in response to a configuration change command entered by the user (FIG. 3), the control circuitry appends an incremental entry 140(1) to the full entry 140(0) (i.e., the existing series or string of entries 140). In contrast to the full entry 140(0), the incremental entry 140(1) includes less than all of the operating parameter instances that are currently used by the data storage equipment 24. Rather, the current configuration version that is currently used by the data storage equipment 24 includes at least one operating parameter instances 110(1) from the incremental entry 140(1) and other operating parameter instances from one or more earlier entries 140 (e.g., the operating parameter instances 110(0)).

Similarly, at time T(2), in response to another configuration change command entered by the user, the control circuitry appends the incremental entry 140(2) to the existing string of entries 140. The configuration change identified by the incremental entry 140(2) may be to any of the operating parameter instances 110 that are currently used by the data storage equipment 24.

Next, at time T(3) and by way of example only, the control circuitry appends a full entry 140(3) that includes all of the instances 110(3) of the operating parameters 110 that define a particular configuration version. Such a situation may occur when the control circuitry periodically reads and saves all of the operating parameter instances currently in use by the data storage equipment 24 (e.g., hourly, nightly, weekly, etc.).

At time T(4), in response to another configuration change command entered by the user, the control circuitry appends another incremental entry 140(4) to the existing string of entries 140. Likewise, in response to yet another configuration change command entered by the user, the control circuitry appends another incremental entry 140(5) to the existing string of entries 140, and so on.

One should appreciate that a full view of all of the instances of the operating parameters 110 currently in use by the data storage equipment 24 can be generated using a combination of full and/or incremental entries. For example, the user can access all of the current instances 110 in use between times T(3) and T(4) simply by accessing the full entry 140(3). As another example, the user can access all of the current instances in use between times T(2) and T(3) by accessing all of the operating parameter instances 110 from the full entry 140(0) and then incrementally updating the operating parameter instances based on the particular operating parameter instances in the incremental entries 140(1) and 140(2). Further details will now be provided with reference to FIG. 7.

Figure 7:
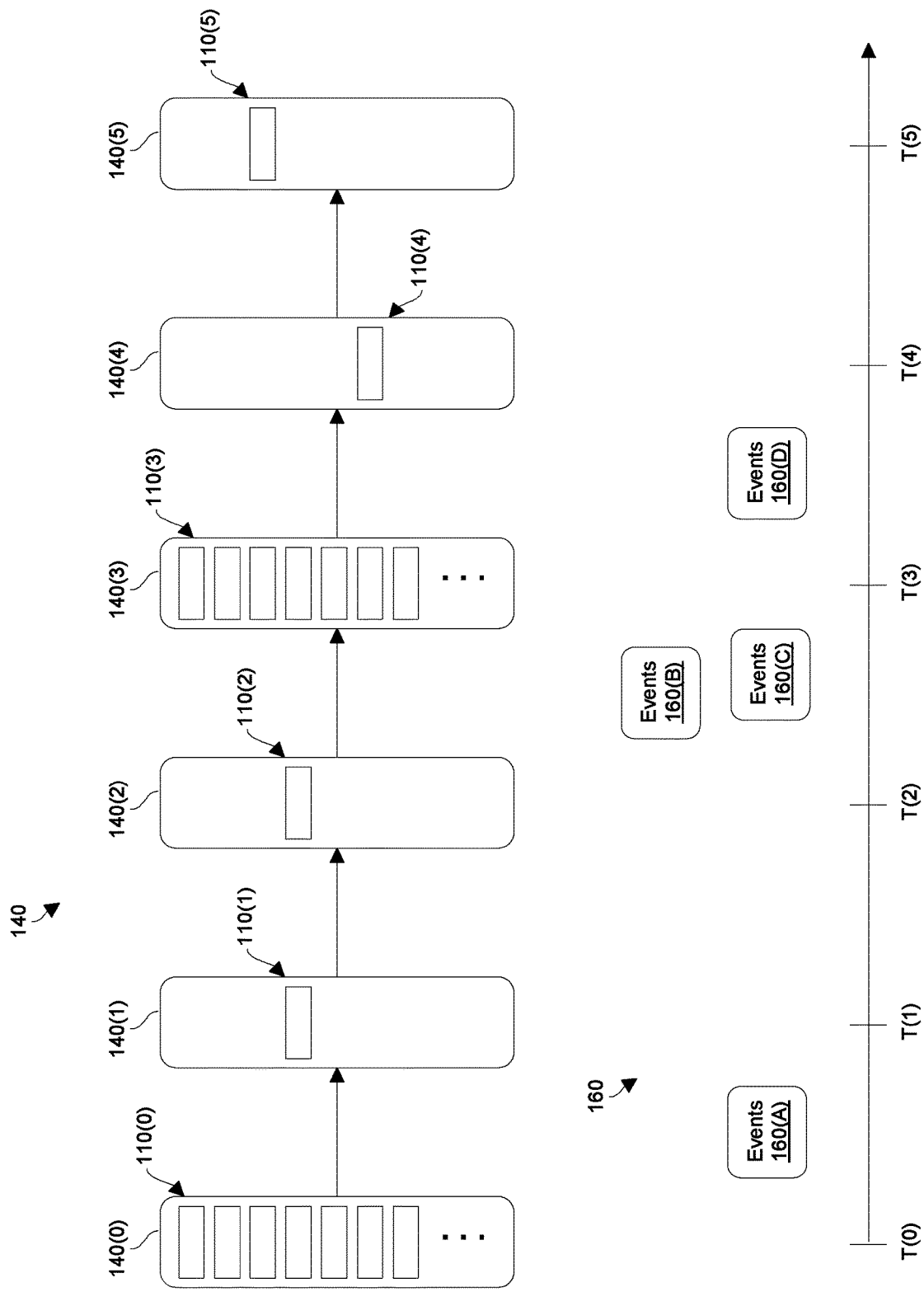
FIG. 7 is a diagram which graphically illustrates a technique for identifying a cause of a particular event.

FIG. 7 shows the graphically illustrates a technique for identifying a cause of a particular event. In particular, FIG. 7 is similar to FIG. 6 but further shows a series of events 160 which occur at particular times. Such events may include performance measurements (e.g., average response times for read operations, write operations, times for backups to complete, etc.), memory space measurements, faults, failures, and so on which are captured over time while the data storage equipment 24 concurrently performs host I/O operations and configuration versioning.

As shown by way of example only, a set of events 160(A) occurs after time T(0) and before time T(1). Additionally, two sets of events 160(B), 160(C) occur after time T(2) and before time T(3). Furthermore, a set of events 160(D) occurs after time T(3) and before time T(4).

In accordance with some embodiments, the control circuitry performs a set of correlation operations and present the graphical illustration of FIG. 7 as a set of results to the user (e.g., in a display) for further evaluation. Here the control circuitry orders/plots the configuration versions and series of events based on timestamps so that the user is able to view correlations between configuration changes and events and thus visually identify root causes of certain events 160.

In accordance with other embodiments, the control circuitry performs a set of correlation operations and performs remedial activities automatically or sends prompts to the user to invoke certain remedial activities based on the results of the correlation operations. Here the control circuitry analyzes the configuration versions and events based on timestamps to electronically identify the causes of the events 160. Example remedial activities include undoing or rolling back a particular configuration change, making an accommodating configuration change to a different operating parameter (e.g., changing a time, adding/removing a resource, etc.), and so on. Further details will now be provided with reference to FIG. 8.

Figure 8:
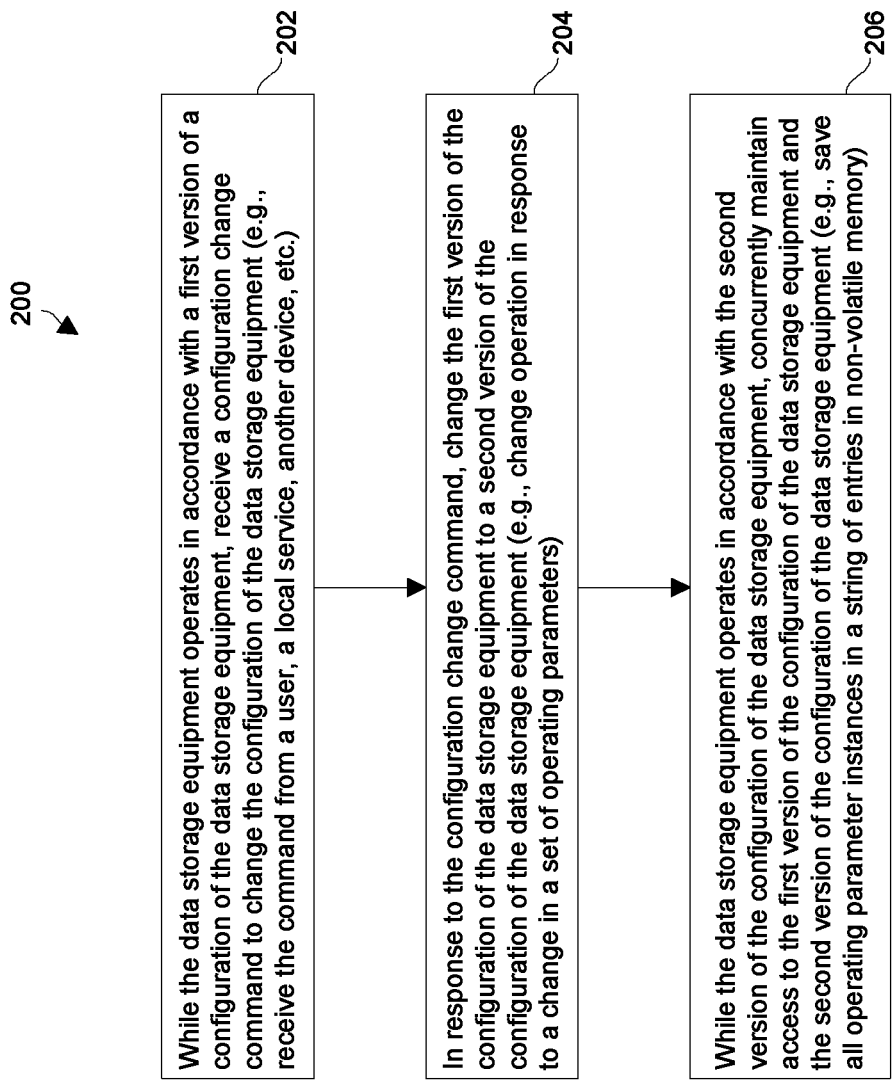
FIG. 8 is a flowchart of a procedure which is performed by the data storage environment of FIG. 1.

FIG. 8 is a flowchart of a procedure 200 which is performed within the data storage environment 20 (also see FIG. 1). Such a procedure 200 may be performed by specialized control circuitry and provides versioning of a configuration of the data storage equipment 24.

At 202, while the data storage equipment operates in accordance with a first version of the configuration of the data storage equipment, the control circuitry receives a configuration change command to change the configuration of the data storage equipment. It should be understood that a configuration change command was described above as being provided by a user. However, the configuration change command may be provided from other sources as well such as from an application or a service running locally on the data storage equipment, from another device, and so on.

At 204, in response to the configuration change command, the control circuitry changes the first version of the configuration of the data storage equipment to a second version of the configuration of the data storage equipment. Here, the operation of the data storage equipment changes due to the change in a set of operating parameters.

At 206, while the data storage equipment operates in accordance with the second version of the configuration of the data storage equipment, the control circuitry concurrently maintains access to the first version of the configuration of the data storage equipment and the second version of the configuration of the data storage equipment. Along these lines, the operating parameter instances may be saved as a series of entries in non-volatile memory.

As described above, improved techniques are directed to versioning a configuration of data storage equipment 24. Such versioning maintains different data storage equipment configuration versions 100 over time (e.g., by appending new entries 140 describing new configuration changes to a string of entries 140 describing previous configuration changes). Accordingly, the different configuration versions 100 can be correlated with previously recorded data storage equipment behavior to identify particular causes for behavior changes (e.g., changes in performance, causes of certain faults or failures, etc.). Once a particular cause has been identified, remedial action may be taken to address the situation (e.g., undo the change, make a compensating adjustment, etc.).

One should appreciate that the above-described techniques do not merely collect and display data. Rather, the disclosed techniques involve representing data storage configuration changes in a particular manner (e.g., a series of entries where new entries representing new configuration changes are appended to the series). Using the methodology disclosed herein, previous configurations of the data storage equipment 24 are efficiently saved and can be correlated with behavior to identify causes of events, patterns, trends, etc. Moreover, such techniques change the operation of the data storage equipment 24 since operating parameter settings that are normally overwritten are now saved in an aggregated manner for future access (e.g., root cause identification, remedial activities, combinations thereof, etc.). In some arrangements, these settings are preserved efficiently within block metadata (BMD) that is used for data protection and/or recovery.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22, the other equipment 26, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that a storage administrator may regularly or irregularly change storage configurations for purposes like configure verification, performance turning, upgrade and maintenance, re-balancing etc. Some configure changes could trigger unexpected performance issues or even data corruption issues. The task of reproducing and root causing those issues can be improved if the configuration changes are correlated with changes in equipment behavior.

In accordance with certain embodiments disclosed herein, the data storage equipment 24 includes a versioning mechanism to track storage configuration change, so even though a new configuration is taking effect, the old setting becomes inactive but remain saved (e.g., as separate metadata appended to a series of earlier saved similar metadata) for a complete configuration point-in-time view. Additionally, upon any data modification, the change as identified by the metadata may be correlated with a current configuration version by a pointer in block metadata. Finally, in case of an event (e.g., an unforeseen or unexpected accident of failure), the configuration versions and correlation information can be dumped and extracted for diagnosis and analytics.

In some embodiments, the data storage equipment 24 utilizes augment data blocks that include BMDs (block metadata). Such augmented blocks are configured to keep specialized information such as checksums and/or pointers for error detection and/or correction. In such embodiments, the various data constructs that store the configuration versions may be stored as part of the BMDs or alongside the BMDs.

One should also appreciate that enterprise storage may be built with rich features (e.g., caching, mirroring, tiering, snapshot, replication, dedup, compression, built-in analysis etc) and complex configurations. During its long life cycle (e.g., more than three years), starting from engineering (e.g., development and testing), to deployment, to pilot-runs, production, planned upgrades until retired, the tester and/or administrator may regularly or irregularly change various operating parameters for purposes such as performance tuning, system maintenance, upgrade, re-balancing etc. Specific examples include adjusting performance related parameters such as read/write cache size, flushing intervals, etc, adding/replacing storage devices, adding/retiring storage nodes, upgrading or downgrading system software, modifying snapshot rules, adding or removing replication targets, and so on.

Such operations may impact system performance, data integrity, and so on. Any mis-operations may trigger accidents including hardware or software design limits or bugs. However, with the improvements disclosed herein, such changes in behavior can be correlated with the configuration changes. Such correlation enables identification of causes, problem reproduction, pattern/trend identification, and so on.

The following situations are easily addressed via the improvements disclosed herein: poorly managed procedures that trigger incorrect system configurations or mis-configurations, unexpected events created by untested parameter combinations, changes to behavior that are difficult to correlate, and identification of root-causes. However, with the improvements, the situations are easily identified and addressed.

In accordance with certain embodiments, the data storage equipment 24 logs all configuration changes as versions. Though a new setting is taking effect, the old setting is stored in a separate metadata store. In particular, the settings are appended (not deleted). Nevertheless, the settings require little memory, are small in size, and can be relatively infrequent.

In accordance with certain embodiments, upon any configuration change, the change is correlated with config-version via version ID (or timestamp) and stored within the data block's block metadata (BMD). Accordingly, there is no separate or external storage required.

In accordance with certain embodiments, any verification requirement or accident that occurs may trigger a dump of the configuration versions and data BMD for examination. With access to such information available, the administrator is able to reproduce and root-cause the event. In some arrangements, configuration versions can also be used for dashboard, auditing and pattern mining.

In accordance with certain embodiments, the data storage equipment 24 models the system configuration as a "config set" (or a family of config-set, depending on how configurations are classified). In these embodiments, configuration changes refer to modifications of built-in settings that can be changed or adjusted (including changing values, turning on/off, resetting, etc.) by a user directly or indirectly.

For example, the user may add new storage node, then enter certain global settings such as total node account or disk numbers which are then updated accordingly. Each modification can be considered a configuration change or a groupd of related modifications can be considered a configuration change (where multiple settings are changed at the same time).

It should be understood that the earlier-described use-case examples were provided for illustrative purposes only. Other use-cases are suitable as well. Other use-cases include:

Performance related changes: read/write cache size settings, flush intervals, thread numbers, etc.

System limit changes: maximum volume/file system number and sizes, etc.

Software/feature status changes: software component upgrades/downgrades, turning services/features on/off, etc.

Data-related feature changes: changes to the checksum mechanism (data, metadata), replica number, deduplication, compression, etc.

Maintenance related tasks and config changes: add/remove disks/nodes, etc. Moreover, it should be understood that the set of instances that belong to the configurations/versions can be considered to reside on a watch list. Here, over time, particular operating parameters can be added to and/or removed from the watch list.

It should be appreciated that each config item in config-set can be version-ed upon change or modification. That is, a version may refer to a set of values at a particular point in time, and marked by unique version ID (e.g., 0, 1, 2, . . . , so that the version IDs increase and are unique). The versions may also be denoted by timestamp which may assist in uniquely identifying each version. Since both the new setting and the old setting are kept, the technique acts like a journal that does not overwrite but only appends in response to configuration changes.

In accordance with certain embodiments, the control circuitry partitions versions into multiple sub-sets depending on their relevance. Examples include cache related versions, deduplication versions, replication versions, etc. Via such partitioning optimization, any change or retrieval of a particular version based on version ID may be faster due to less locking contention.

In accordance with certain embodiments, the configuration versioning may be maintained indefinitely and used for accounting/auditing, issue diagnosis, etc. Such operation may be made available only on a privileged basis and be performed transparently to most users.

In accordance with certain embodiments, configuration versions are persisted to non-volatile memory (e.g., in a file, in binary or Key-Value format, etc.). In a storage cluster with multiple nodes, the configuration may take a global view, where there is a sync-up across nodes so that the configuration versions are globally consistent. One should appreciate that configuration changes may be infrequent so that versioning and sync up is creates relatively low overhead.

In accordance with certain embodiments, depending on cluster types, configuration may only be performed in a manage node, or may be allowed on any node. If from any node, the control circuitry maintains a correct global view using timestamps or the like for sync-up across nodes for configuration consistency.

In accordance with certain embodiments, the configuration versions are stored in a tree-like structure (each config-item is a fine-grain node in the tree), or list structure (so a big enough structure to keep all config-set), or combination of tree and list.

In accordance with certain embodiments, different services may be able to access the configuration versions. For example, an inject (or load) module may be able to replace existing versions. Additionally, a dump module may be able to read out all existing configuration versions (for auditing, trouble-shooting, pattern, mining, etc.).

In accordance with certain embodiments, correlation between configuration changes and equipment behavior is performed. Such correlation may reflect information about "under what kinds of system configurations a new block is generated or an existing block is modified". Accordingly, the techniques enable users (e.g., development engineers, admins, etc.) to better understand certain types of data storage equipment behavior and the causes of such behavior.

In accordance with certain embodiments, the version IDs and/or timestamps operate as pointers. In particular, the version IDs and/or timestamps indicate particular configuration versions along the series of entries that is kept. Such operation is relatively lightweight in terms of processing overhead and storage consumption.

In accordance with certain embodiments, configuration versioning is independent of normal data snapshotting. Accordingly, such versioning may be enabled/disabled over time without interfering with snapshotting operations.

In accordance with certain embodiments, the following are features of configuration versioning:
Both config-version and block metadata can be dumped, extracted and correlated.
Inject: one or more new settings go into effect in place of previous settings
Dump: previous settings are read from non-volatile storage (e.g., BMDs)
Extract: based on pre-defined format, the configuration is extracted and parsed into a series of earlier configuration versions
Transform and analytics: many old versions can be transformed into some analytics-friendly format such as column-style or loaded into some database, such as for pattern mining or time series analytics (ordered by timestamp)

In accordance with a particular use case, the configuration versions are used in an auditing scenario where config-set versions (old and current) are dumped, extracted and output to a dashboard that show each item with a change timestamp, old and new values and by whom (also see FIG. 3). Such operation enables examination of any improper settings, conflicts between settings, etc. Over time (indicated by timestamp), additional analysis is performed such as exploring and mining for change patterns, or frequent operations, or correlation between operations.

In accordance with another use case, testing and verification is performed using the configuration versions. That is, the config-set versions are completely replaced (e.g., using an inject module) to test or compare any conflict in the config.

In accordance with yet another use case, the configuration versions are accessed for trouble shooting. In particular, the equipment may have encountered an unexpected exception or situation such as performance degradation, data corruption, or system panic. Advantageously, both config-set versions and relevant metadata can be dumped and uploaded for correlation analytics.

As described earlier and in accordance with certain embodiments, as all config versions and correlation between config changes and data change are kept, the control circuitry is able to then extract the version ID (or comparing to the timestamp) from the target BMD. Such operation makes it easy to identify/diagnose certain problems and their causes.

As further described above and in accordance with certain embodiments, the control circuitry tracks configuration changes and correlates then with data changes. Such operation enables configuration change auditing, verification, pattern mining, issue re-produce and trouble-shooting.

In some arrangements, the configuration changes are saved as append-only versions. In some arrangements, the configuration changes are correlated with data storage equipment behavior (e.g., operating events and statistics captured over time). In some arrangements, the configuration changes are analyzed to identify issues, patterns, trends, etc.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment, a method of versioning a configuration of the data storage equipment, the method comprising:
    while the data storage equipment operates in accordance with a first version of the configuration of the data storage equipment, receiving a configuration change command to change the configuration of the data storage equipment;
    in response to the configuration change command, changing the first version of the configuration of the data storage equipment to a second version of the configuration of the data storage equipment; and
    while the data storage equipment operates in accordance with the second version of the configuration of the data storage equipment, concurrently maintaining access to the first version of the configuration of the data storage equipment and the second version of the configuration of the data storage equipment;
    wherein the data storage equipment includes storage processing circuitry and a plurality of storage devices, the storage processing circuitry being constructed and arranged to perform redundant array of independent disks (RAID) operations on the plurality of storage devices;
    wherein each version of the configuration of the data storage equipment includes a group of data storage equipment settings that controls operation of the storage processing circuitry;

wherein the method further includes:
prior to receiving the configuration change command, creating a first group of data storage equipment settings as at least a portion of the first version;
wherein changing the first version to the second version includes:
modifying the first group of data storage equipment settings to form a second group of data storage equipment settings as at least a portion of the second version, the second group including at least one data storage equipment setting that is different from the data storage equipment settings of the first group;
wherein maintaining access to the first version and the second version includes:
simultaneously persistently storing both the first group of data storage equipment settings and the second group of data storage equipment settings within the data storage equipment;
wherein the data storage equipment performs host input/output (I/O) operations on behalf of a set of host computers when the data storage equipment operates in accordance with the first version of the configuration and the second version of the configuration;
wherein the configuration of the data storage equipment includes different operating features; and
wherein modifying the first group of data storage equipment settings includes:
modifying at least one of the different operating features of the configuration while the data storage equipment performs the host I/O operations.

2. A method as in claim 1, further comprising:
while the data storage equipment operates in accordance with the first version of the configuration and while the data storage equipment operates in accordance with the second version of the configuration, recording behavior of the data storage equipment.

3. A method as in claim 2 wherein concurrently maintaining access to the first version of the configuration and the second version of the configuration includes:
storing, in non-volatile memory, a first version entry within a series of version entries that identifies changes to the configuration of the data storage equipment over time, the first version entry identifying a first change made to the configuration of the data storage equipment at a first time, and
storing, in the non-volatile memory, a second version entry within the series of version entries that identifies changes to the configuration of the data storage equipment over time, the second version entry identifying a second change made to the configuration of the data storage equipment at a second time that is after the first time.

4. A method as in claim 3 wherein recording the behavior of the data storage equipment includes:
storing, in the non-volatile memory, a series of behavior entries that identifies behavior events occurring within the data storage equipment over time.

5. A method as in claim 4, further comprising:
performing a set of correlation operations based on the series of behavior entries and the series of version entries to generate a set of correlation results that identify correlations between the behavior events occurring within the data storage equipment and the changes to the configuration of the data storage equipment.

6. A method as in claim 5, further comprising:
based on the set of correlation results, electronically outputting a user notification that identifies a particular configuration change as a cause of a particular behavior event occurring within the data storage equipment.

7. A method as in claim 6, further comprising:
while the data storage equipment operates in accordance with the second version of the configuration of the data storage equipment, receiving another configuration change command to change the configuration of the data storage equipment;
in response to the other configuration change command, changing the second version of the configuration of the data storage equipment to a third version of the configuration of the data storage equipment; and
while the data storage equipment operates in accordance with the third version of the configuration of the data storage equipment, concurrently maintaining access to the first version of the configuration of the data storage equipment, the second version of the configuration of the data storage equipment, and the third version of the configuration of the data storage equipment.

8. A method as in claim 7 wherein storing the first version entry within the series of version entries that identifies changes to the configuration of the data storage equipment over time includes:
appending the first version entry to a first string of version entries that identifies previous changes to the configuration of the data storage equipment to form a second string of version entries;
wherein storing the second version entry within the series of version entries that identifies changes to the configuration of the data storage equipment over time includes:
appending the second version entry to the second string of version entries to form a third string of version entries;
wherein concurrently maintaining access to the first version, the second version, and the third version includes:
appending a third version entry to the third string of version entries to form a fourth string of version entries, the third version entry identifying a third change made to the configuration of the data storage equipment at a third time that is after the second time, and the fourth string of version entries defining the third version of the configuration of the data storage equipment.

9. A method as in claim 1 wherein the different operating features include operating parameters that control allocation of data storage equipment resources;
wherein modifying at least one of the different operating features of the configuration includes:
adjusting a set of the operating parameters to modify allocation of a set of the data storage equipment resources, the adjustment to the set of the operating parameters causing a change in host I/O operation performance.

10. A method as in claim 9 wherein adjusting the set of the operating parameters to modify allocation of the set of the data storage equipment resources includes:
changing a memory management setting to modify use of semiconductor memory of the data storage equipment.

11. A method as in claim 9 wherein adjusting the set of the operating parameters to modify allocation of the set of the data storage equipment resources includes:
   changing a storage device assignment setting to modify assignment of storage devices to host data storage objects within the data storage equipment.

12. A method as in claim 9 wherein adjusting the set of the operating parameters to modify allocation of the set of the data storage equipment resources includes:
   changing a snapshot setting to modify operation of a snapshot service of the data storage equipment.

13. A method as in claim 9 wherein adjusting the set of the operating parameters to modify allocation of the set of the data storage equipment resources includes:
   changing a replication setting to modify operation of a replication service of the data storage equipment.

14. Data storage equipment, comprising:
   memory; and
   control circuitry coupled with the memory, the memory storing instructions which, when carried out by the control circuitry, cause the control circuitry to perform a method including:
      while the data storage equipment operates in accordance with a first version of a configuration of the data storage equipment, receiving a configuration change command to change the configuration of the data storage equipment,
      in response to the configuration change command, changing the first version of the configuration of the data storage equipment to a second version of the configuration of the data storage equipment, and
      while the data storage equipment operates in accordance with the second version of the configuration of the data storage equipment, concurrently maintaining access to the first version of the configuration of the data storage equipment and the second version of the configuration of the data storage equipment;
   wherein the data storage equipment further comprises storage processing circuitry and a plurality of storage devices, the storage processing circuitry being constructed and arranged to perform redundant array of independent disks (RAID) operations on the plurality of storage devices;
   wherein each version of the configuration of the data storage equipment includes a group of data storage equipment settings that controls operation of the storage processing circuitry;
   wherein the method further includes:
      prior to receiving the configuration change command, creating a first group of data storage equipment settings as at least a portion of the first version;
      wherein changing the first version to the second version includes:
         modifying the first group of data storage equipment settings to form a second group of data storage equipment settings as at least a portion of the second version, the second group including at least one data storage equipment setting that is different from the data storage equipment settings of the first group;
      wherein maintaining access to the first version and the second version includes:
         simultaneously persistently storing both the first group of data storage equipment settings and the second group of data storage equipment settings within the data storage equipment;
      wherein the data storage equipment performs host input/output (I/O) operations on behalf of a set of host computers when the data storage equipment operates in accordance with the first version of the configuration and the second version of the configuration;
   wherein the configuration of the data storage equipment includes different operating features; and
   wherein modifying the first group of data storage equipment settings includes:
      modifying at least one of the different operating features of the configuration while the data storage equipment performs the host I/O operations.

15. Data storage equipment as in claim 14, further comprising:
   a host interface coupled with the control circuitry, the host interface being constructed and arranged to communicate with the set of host computers;
   wherein the data storage equipment performs the host I/O operations through the host interface; and
   wherein the control circuitry, when concurrently maintaining access to the first version of the configuration and the second version of the configuration, is constructed and arranged to:
      store, in the memory, a first version entry within a series of version entries that identifies changes to the configuration of the data storage equipment over time, the first version entry identifying a first change made to the configuration of the data storage equipment at a first time, and
      store, in the memory, a second version entry within the series of version entries that identifies changes to the configuration of the data storage equipment over time, the second version entry identifying a second change made to the configuration of the data storage equipment at a second time that is after the first time.

16. Data storage equipment as in claim 15 wherein the different operating features include operating parameters that control allocation of data storage equipment resources;
   wherein the control circuitry, when modifying at least one of the different operating features of the configuration, is constructed and arranged to:
      adjust a set of the operating parameters to modify allocation of a set of the data storage equipment resources, the adjustment to the set of the operating parameters causing a change in host I/O operation performance.

17. Data storage equipment as in claim 16 wherein the control circuitry is further constructed and arranged to:
   while the data storage equipment operates in accordance with the first version of the configuration and while the data storage equipment operates in accordance with the second version of the configuration, record behavior of the data storage equipment;
   wherein the control circuitry, when recording the behavior of the data storage equipment, is constructed and arranged to:
      store, in the memory, a series of behavior entries that identifies behavior events occurring within the data storage equipment over time; and
   wherein the control circuitry is further constructed and arranged to:
      perform a set of correlation operations based on the series of behavior entries and the series of version entries to generate a set of correlation results that identify correlations between the behavior events occurring within the data storage equipment and the changes to the configuration of the data storage equipment, and based on the set of correlation results, electronically output a signal indicating that a particular configuration change is a cause of a particular behavior event occurring within the data storage equipment.

18. A computer program product having a non-transitory computer readable medium which stores a set of instructions to version a configuration of data storage equipment; the set of instructions, when carried out by computerized circuitry of the data storage equipment, causing the computerized circuitry to perform a method of:

while the data storage equipment operates in accordance with a first version of the configuration of the data storage equipment, receiving a configuration change command to change the configuration of the data storage equipment;

in response to the configuration change command, changing the first version of the configuration of the data storage equipment to a second version of the configuration of the data storage equipment; and while the data storage equipment operates in accordance with the second version of the configuration of the data storage equipment, concurrently maintaining access to the first version of the configuration of the data storage equipment and the second version of the configuration of the data storage equipment;

wherein the data storage equipment includes storage processing circuitry and a plurality of storage devices, the storage processing circuitry being constructed and arranged to perform redundant array of independent disks (RAID) operations on the plurality of storage devices;

wherein each version of the configuration of the data storage equipment includes a group of data storage equipment settings that controls operation of the storage processing circuitry;

wherein the method further includes:
prior to receiving the configuration change command, creating a first group of data storage equipment settings as at least a portion of the first version;

wherein changing the first version to the second version includes:
modifying the first group of data storage equipment settings to form a second group of data storage equipment settings as at least a portion of the second version, the second group including at least one data storage equipment setting that is different from the data storage equipment settings of the first group;

wherein maintaining access to the first version and the second version includes:
simultaneously persistently storing both the first group of data storage equipment settings and the second group of data storage equipment settings within the data storage equipment;

wherein the data storage equipment performs host input/output (I/O) operations on behalf of a set of host computers when the data storage equipment operates in accordance with the first version of the configuration and the second version of the configuration;

wherein the configuration of the data storage equipment includes different operating features; and wherein modifying the first group of data storage equipment settings includes:
modifying at least one of the different operating features of the configuration while the data storage equipment performs the host I/O operations.

19. A computer program product as in claim 18 wherein the method further includes:
performing a set of correlation operations based on a series of behavior entries and a series of version entries to generate a set of correlation results that identify correlations between behavior events occurring within the data storage equipment and changes to the configuration of the data storage equipment; and based on the set of correlation results, electronically outputting a user notification that identifies a particular configuration change as a cause of a particular behavior event occurring within the data storage equipment.

20. A computer program product as in claim 18 wherein the method further includes:
while the data storage equipment operates in accordance with the first version of the configuration and while the data storage equipment operates in accordance with the second version of the configuration, recording behavior of the data storage equipment.

* * * * *